United States Patent
Luka

(10) Patent No.: US 10,699,391 B2
(45) Date of Patent: Jun. 30, 2020

(54) DYNAMIC RANGE EXPANSION HIGHLIGHT INFORMATION RESTORATION

(71) Applicant: Disney Enterprises, Inc., Burbank, CA (US)

(72) Inventor: Stefan Luka, Sunland, CA (US)

(73) Assignee: Disney Enterprises, Inc., Burbank, CA (US)

(*) Notice: Subject to any disclaimer, the term of this patent is extended or adjusted under 35 U.S.C. 154(b) by 443 days.

(21) Appl. No.: 15/461,424

(22) Filed: Mar. 16, 2017

(65) Prior Publication Data

US 2017/0316553 A1 Nov. 2, 2017

Related U.S. Application Data

(60) Provisional application No. 62/329,818, filed on Apr. 29, 2016.

(51) Int. Cl.
| | |
|---|---|
| *G06K 9/00* | (2006.01) |
| *G06T 5/00* | (2006.01) |
| *G06T 7/90* | (2017.01) |
| *G06T 7/00* | (2017.01) |

(52) U.S. Cl.
CPC ............ *G06T 5/008* (2013.01); *G06T 7/0002* (2013.01); *G06T 7/90* (2017.01); *G06T 2207/20208* (2013.01)

(58) Field of Classification Search
CPC ......... G06T 5/008; G06T 7/90; G06T 7/0002; G06T 2207/20208; G06T 2200/21; G06T 2207/10024; G06T 5/50; G06T 2207/20221; G06T 5/005; G06T 5/007; G06T 5/30

USPC ......................................................... 382/167
See application file for complete search history.

(56) References Cited

U.S. PATENT DOCUMENTS

| | | | |
|---|---|---|---|
| 9,172,890 B2 | 10/2015 | Weissman et al. | |
| 9,679,366 B2 * | 6/2017 | Xu | H04N 1/6052 |
| 2014/0002479 A1 | 1/2014 | Muijs et al. | |
| 2014/0037206 A1 | 2/2014 | Newton et al. | |

(Continued)

FOREIGN PATENT DOCUMENTS

| | | |
|---|---|---|
| CN | 102386612 A | 3/2012 |
| CN | 102696220 A | 9/2012 |

(Continued)

OTHER PUBLICATIONS

Eilertsen et al., Evaluation of Tone Mapping Operators for HDR-Video, Computer Graphics Forum 2014 The Eurographics Association and John Wiley & Sons Ltd. Published by John Wiley & Sons Ltd., 2013, pp. 1-10, vol. 32, No. 7.

(Continued)

*Primary Examiner* — Andrew M Moyer
(74) *Attorney, Agent, or Firm* — Patterson + Sheridan, LLP

(57) ABSTRACT

Systems and methods are provided for generating high dynamic range (HDR) content using existing standard dynamic range (SDR) content. HDR content is generated by restoring lost detail in the SDR content using source content from which the SDR content was derived. The HDR content generated from the SDR content also preserves any color characteristics, such as color grading, of the SDR content in conjunction with the restoration of lost detail.

20 Claims, 6 Drawing Sheets

(56) References Cited

U.S. PATENT DOCUMENTS

| | | |
|---|---|---|
| 2014/0025941 A1 | 8/2014 | Van Der Vleuten et al. |
| 2014/0247870 A1 | 9/2014 | Mertens |
| 2014/0369410 A1 | 12/2014 | Olivier et al. |
| 2015/0117791 A1 | 4/2015 | Mertens |
| 2015/0201222 A1 | 7/2015 | Mertens |
| 2016/0253792 A1* | 9/2016 | Xu .................. H04N 1/6052 345/590 |

FOREIGN PATENT DOCUMENTS

| | | |
|---|---|---|
| CN | 103069809 A | 4/2013 |
| CN | 104463820 A | 3/2015 |
| WO | 2014/041471 A1 | 3/2014 |
| WO | 2014/056679 A1 | 4/2014 |
| WO | 2014/128586 A1 | 8/2014 |
| WO | 2015/007505 A1 | 1/2015 |
| WO | 2015061335 A2 | 4/2015 |

OTHER PUBLICATIONS

Dong, Yuanyuan, A Visual Attention Model for High Dynamic Range (HDR) Video Content, Thesis submitted to The University of British Columbia, Dec. 2014, pp. 1-94, Vancouver, Canada.
Chinese Office Action for Application No. 201710286246.3 dated Mar. 13, 2020

\* cited by examiner

IDENTIFY ONE OR MORE AREAS OF SDR CONTENT WHERE DETAIL HAS BEEN LOST
100

CREATE IMAGE PROCESSING MAP BASED ON THE IDENTIFIED ONE OR MORE AREAS
110

USE PIXELS OF THE IMAGE PROCESSING MAP FOR LOCAL COLOR MATCHING TO SOURCE CONTENT
120

SUBSTITUTE PIXELS OF THE SDR CONTENT WITH CORRESPONDING PIXELS IDENTIFIED IN THE IMAGE PROCESSING MAP
130

FIG. 1A

```
┌─────────────────────────────────────────────┐
│  FILTER SOURCE CONTENT TO ISOLATE HIGH FREQUENCY │
│                   AREAS                      │
│                    102                       │
└─────────────────────────────────────────────┘
                     │
                     ▼
┌─────────────────────────────────────────────┐
│  FILTER SDR CONTENT TO ISOLATE HIGH FREQUENCY │
│                   AREAS                      │
│                    104                       │
└─────────────────────────────────────────────┘
                     │
                     ▼
┌─────────────────────────────────────────────┐
│   DETERMINE DIFFERENCE BETWEEN HIGH FREQUENCY │
│   AREAS OF THE SOURCE CONTENT AND SDR CONTENT AND │
│         GENERATE A FIRST PIXEL MAP           │
│                    106                       │
└─────────────────────────────────────────────┘
```

FIG. 1B

DYNAMIC RANGE EXPANSION HIGHLIGHT INFORMATION RESTORATION

TECHNICAL FIELD

The present disclosure relates generally to high dynamic range content creation.

DESCRIPTION OF THE RELATED ART

Interest in distributing video or other visual content having high dynamic range (HDR) and wide color gamut (WCG) is growing due to its ability to provide a viewing experience that is more enhanced when compared to conventional standard dynamic range (SDR) and standard color gamut (SCG) content.

BRIEF SUMMARY OF THE DISCLOSURE

Various embodiments are directed to expanding SDR content into HDR content by analyzing source content and a color-graded SDR master to identify where details, such as highlight information, from the source material have been lost. Utilizing maps, areas where the lost details can be restored are identified, and localized color transformations are performed on the source material to obtain a desired match in terms of luminance and color. Information regarding the matched luminance and color can be transferred to the color-graded master thereby restoring lost details that result in HDR content.

In accordance with one embodiment of the present disclosure, a computer-implemented method, comprises identifying one or more areas of standard dynamic range (SDR) content where detail has been lost. An image processing map can be created based on the identified one or more areas. Pixels of the image processing map can be utilized for local color matching to source content, and pixels of the SDR content can be substituted with corresponding pixels identified in the image processing map.

In some embodiments, the SDR content comprises an original color graded master. In some embodiments, the SDR content is derived from the source content. In some embodiments, the detail comprises bright detail information clipped or rolled off from the SDR content.

The identifying of the one or more areas of SDR content where detail has been lost may comprise filtering the source content to isolate high spatial frequency areas of the source content. The method may further comprise filtering the SDR content to isolate high spatial frequency areas of the SDR content. Further still, the method may comprise determining differences between the high spatial frequency areas of the source content and the high spatial frequency areas of the SDR content and generating a first pixel map representative of the differences between the high spatial frequency areas of the source content and the high spatial frequency areas of the SDR content.

The creation of the image processing map comprises performing morphological dilation on the one or more identified areas. Moreover, morphological erosion may be performed on the one or more identified areas. In some embodiments, a second pixel map can be defined based on the morphological dilation and erosion of pixels corresponding to the one or more identified areas of the first pixel map. The image processing map can be defined based on differences between the first and second pixel maps.

The differences between the first and second pixel maps define boundaries about the pixels corresponding to the one or more identified areas of the first pixel map. The local color matching to the source content comprises performing color balancing based upon a set of color correspondences between the source content and the SDR content at the defined boundaries. The substitution of pixels comprises transforming pixel RGB values into one or more color components.

In accordance with another embodiment, a system may comprise a comparator adapted to receive images representative of source content and standard dynamic range (SDR) content derived from the source content, and identify one or more areas of standard dynamic range (SDR) content where detail has been lost. The system may comprise a morphological operation unit adapted to apply morphological operations to the SDR content and source content creating an image processing map based on the identified one or more areas. A color transformation unit can be adapted to use pixels of the image processing map for local color matching to the source content. A pixel merge unit can be adapted to substitute pixels of the SDR content with corresponding pixels identified in the image processing map.

In some embodiments, the comparator comprises a high pass filter adapted to filter the source content and the SDR content to isolate respective areas of high spatial frequency in the source content and the SDR content. In some embodiments, the comparator is further adapted to compare the areas of high spatial frequency in the source content and the SDR content. In some embodiments, the comparison is based upon determining whether a variance in the areas of high spatial frequency in the source content are greater than a variance in the areas of high spatial frequency in the SDR content.

The image processing map is representative of boundaries surrounding pixels corresponding to the areas of high spatial frequency where the detail is to be restored. The applied morphological operations comprise a dilation operation followed by an erosion operation.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 1A is a flow chart illustrating example operations that can be performed to HDR content in accordance with various embodiments.

FIG. 1B is a flow chart illustrating filtering and comparison operations in accordance with various embodiments.

The figures are not exhaustive and do not limit the present disclosure to the precise form disclosed.

DETAILED DESCRIPTION

Efforts are being undertaken to re-master existing SDR content to HDR content. However, conventional methods of re-mastering SDR content involve "re-grading" source content or material, such as raw media or film scans, and can result in altering intended appearance of the video/visual content. Additionally, re-mastering SDR content in accordance with such conventional methods can result in a loss of detail.

For example, content providers such as production studios may have existing SDR content, such as movies, TV shows, games, etc. which they wish to re-release in the HDR format. Using conventional techniques, such as "digital intermediate," a movie can be digitized, where information is taken from a film negative and rendered through a digital emulation process that mimics the process of producing a film print. This can involve scanning a film negative into a computer, performing color correction, color grading, and film recording (transferring digital images to film). In the event the movie is digitally recorded and/or the movie is not to be output to film, digital intermediate can also include final mastering of digital source content, such as a raw digital file.

Conventional color grading and correction is a manual process performed by a colorist using digital color grading tools. To match the color grade of generated HDR content with that of the existing SDR content, the colorist reproduces the color grade of the existing SDR content by trial and error. This is because, typically, no record of color grading operations are maintained, and color grading is tied to the particular hardware and/or software used to color grade the original master.

Figure 3:
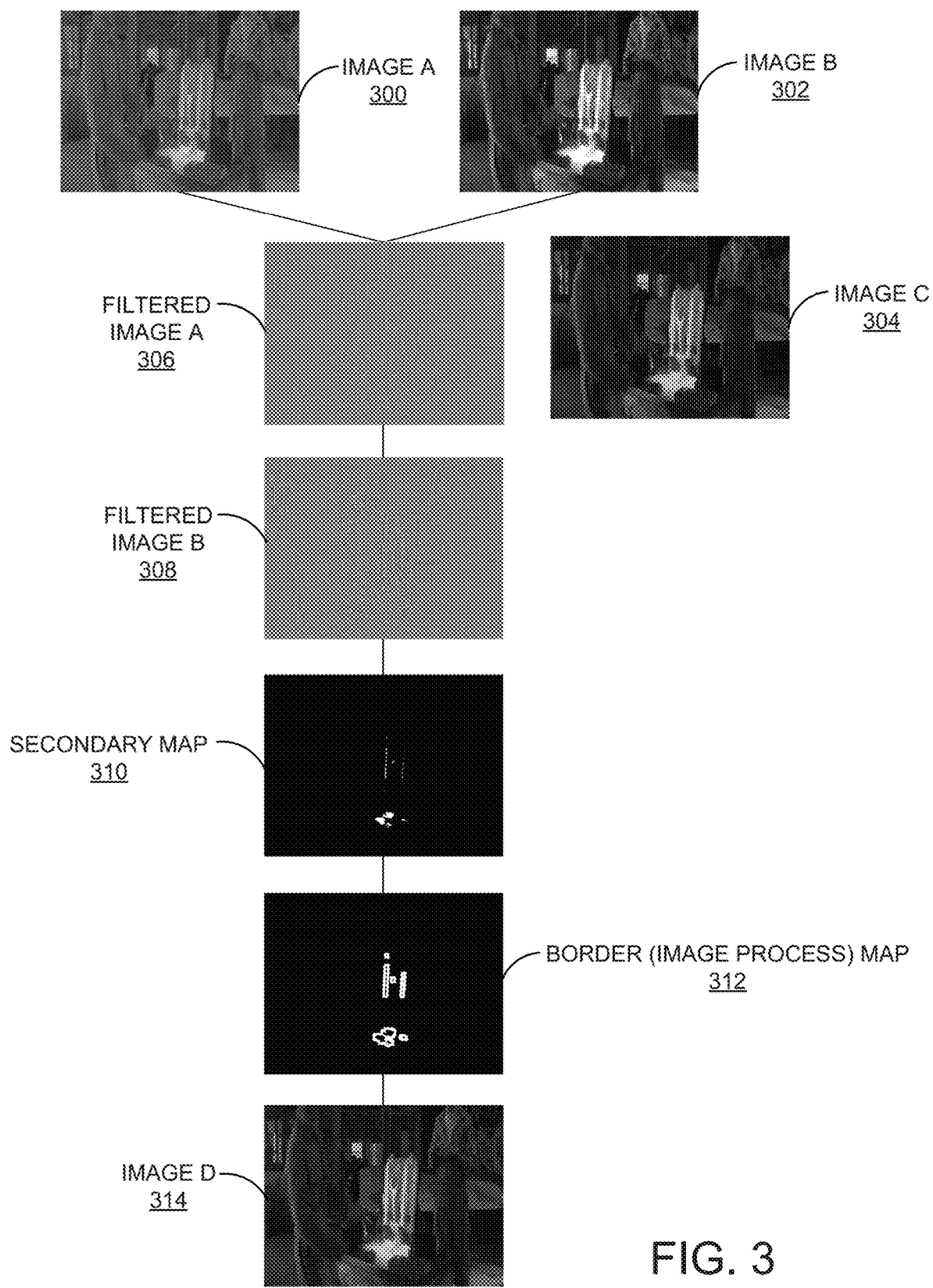
FIG. 3 illustrates example images representative of HDR content generation in accordance with various embodiments.

Moreover, digital intermediate color grading emulates the tone mapping that is present in a film print. The emulation of a film print results in the SDR content having less detail than the source content. For example, details such as highlight information, reflections, bright image elements such as bright white clouds, skies, etc. may be present in the negative but are lost by the emulation of the print stock's limited dynamic range and corresponding tone mapping. The same loss of detail can occur when the source content is a raw digital file that must be mapped down for presentation on or via SDR media. Image B 302 of FIG. 3 is an example of SDR content after undergoing print emulation and color correction processes described above. For comparison purposes, image C 304 is an example of image B 302 after it has been rescaled to preserve the original colors on the higher luminance of an HDR display. This could serve as a starting point for color grading in an HDR remastering process. However, image C 304 is underexposed and demonstrates that highlight details have been lost and cannot be recovered from image B 302.

Although content providers have source content, such as existing film scans and/or raw digital camera files, conventional systems and methods of re-grading and converting SDR content to HDR content attempt to predict or guess how to replace lost details without relying on the source content. Thus, time and resources are unnecessarily spent attempting to recreate a desired color grading, and details may still be lost and/or inaccurately reproduced.

Figure 1C:
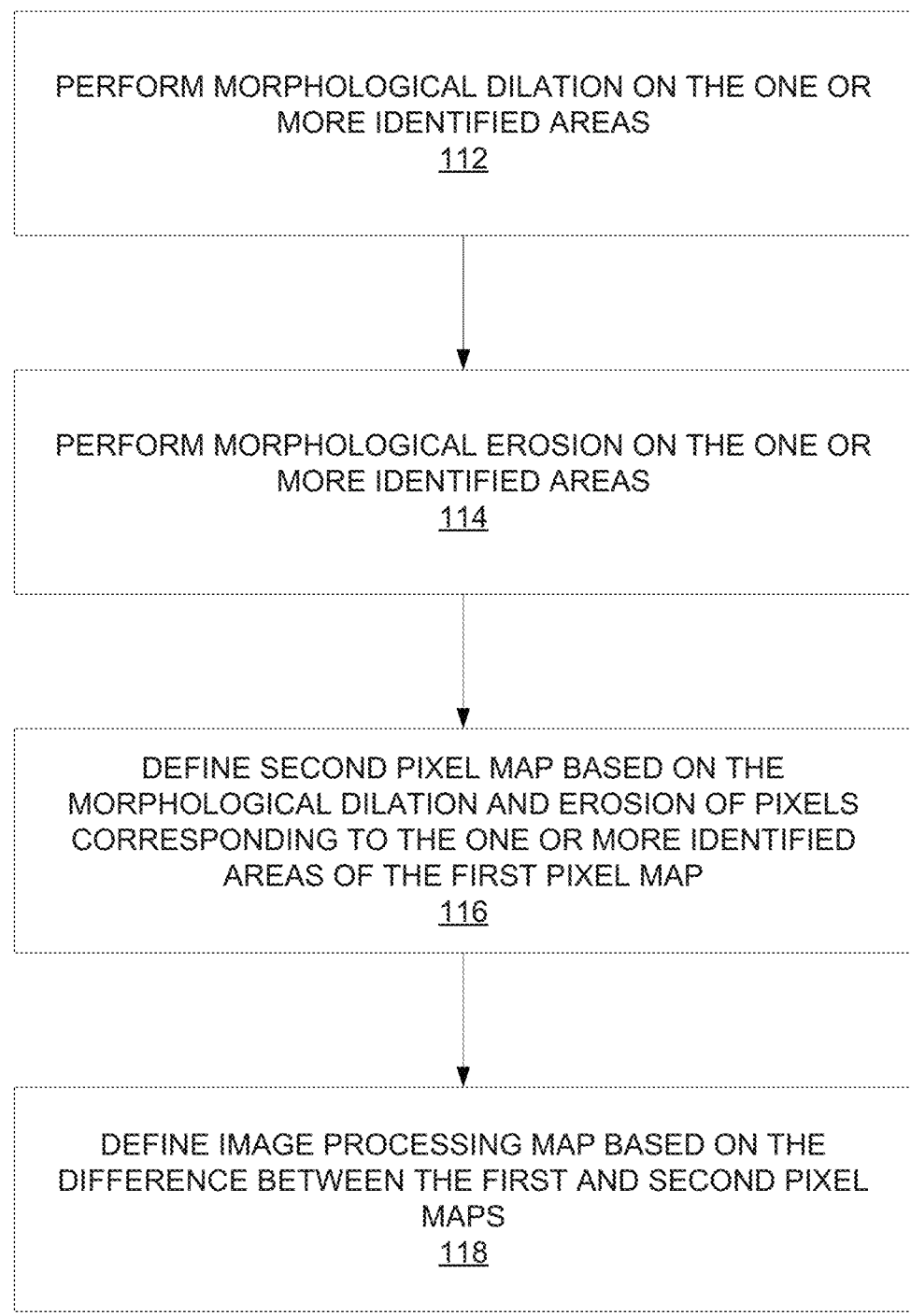
FIG. 1C is a flow chart illustrating morphology operations and pixel map generation in accordance with various embodiments.

Accordingly, various embodiments described herein leverage source content to generate HDR content (expanding and/or restoring details present in the source content) while also preserving the creative look and feel established during an original color grading (e.g., maintaining color characteristics of an existing (SDR) master). FIGS. 1A-1C illustrate example operations performed in accordance with various embodiments for generating HDR content based on existing color graded SDR content, such as an existing SDR master, and source content. FIGS. 1A-1C will be described in conjunction with FIG. 2, a schematic representation of an HDR content generation system 200, and FIG. 3, a collection of example images reflecting various stages of HDR content generation in accordance with various embodiments as well as an example image of conventionally generated HDR content for comparison.

At operation 100 of FIG. 1A, one or more areas of SDR content where detail has been lost are identified. As described above, during digital intermediate processing, a raw digital file or film negative may be processed through a film print emulation during which, tone mapping occurs. Image 300 of FIG. 3 is an example of a film scan. Tone mapping, when used to create SDR content, such as an SDR master, can result in lost details, and it is this information that can be reincorporated into HDR content generated in accordance with various embodiments described herein.

Figure 2:
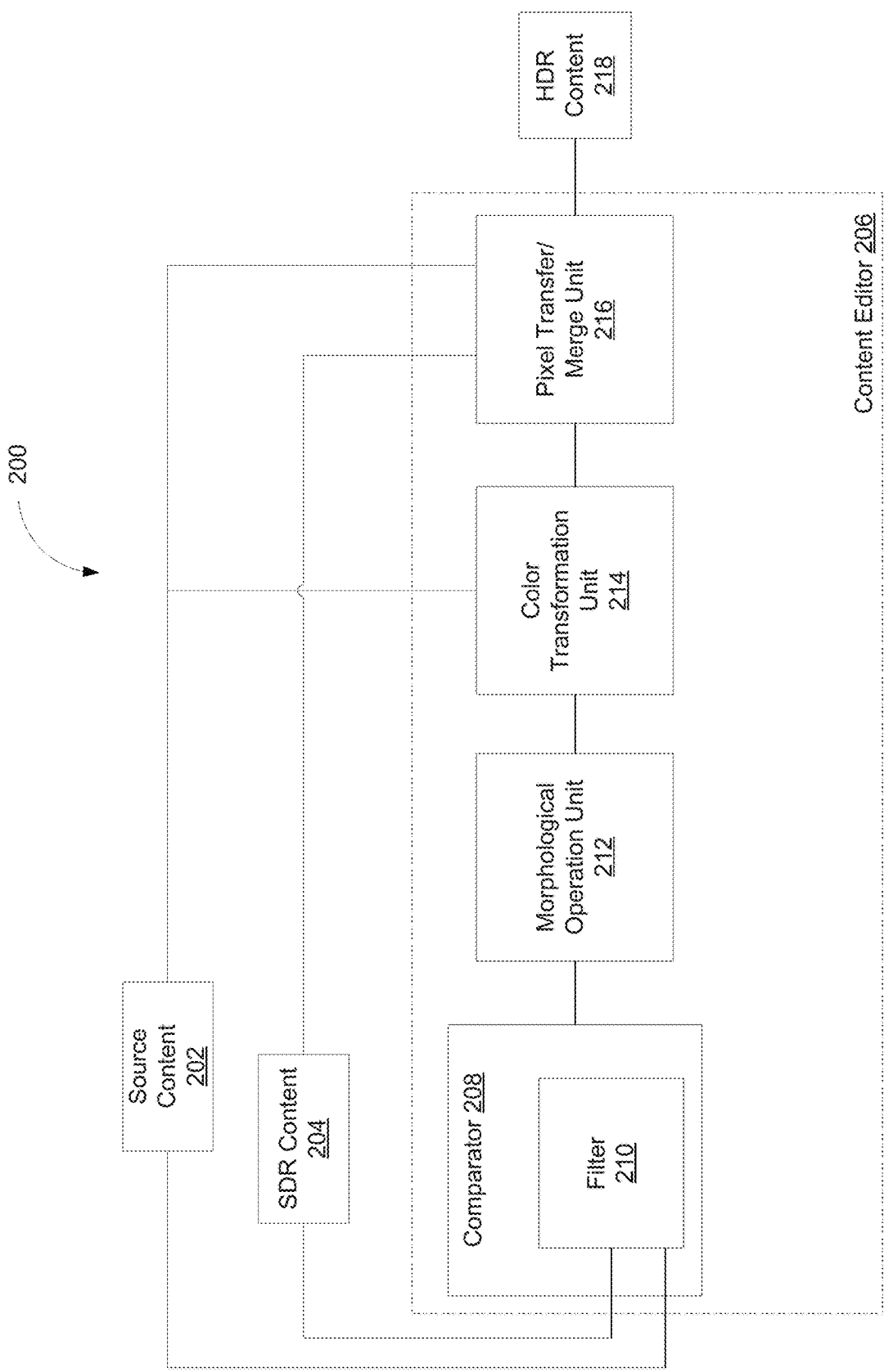
FIG. 2 is a schematic representation of a content editing system utilized in generating HDR content in accordance with various embodiments.

In particular, and as illustrated in FIG. 1B at operations 102 and 104, respectively, source content 202 of FIG. 2 and SDR content 204 of FIG. 2 are filtered to isolate high frequency areas by feeding source content 202 and SDR content 204 into high pass filter 210. Image data can be decomposed into spatial frequencies, where areas of an image having high frequencies relate to the fine details of an image, and areas of an image having low frequencies are representative of tone and color transitions. It should be noted that the threshold for what may qualify as low and/or high frequency may be adjusted depending on the characteristics of the source content. These processes, in addition to those that will be discussed below, can be performed via a content editor 206 running on a computer system, where the systems and methods disclosed herein may be implemented as a plug-in component or application to content editor 206, for example. However, other implementations are also possible in accordance with other embodiments, such as a stand-alone application.

Image 306 of FIG. 3 is an example of raw film scan 300 after filtering. Recalling that high frequency areas relate to fine details and low frequency areas relate to tone and color transitions, what remains after high pass filtering through filter 210 of FIG. 2 are those fine details, whereas the tone and color transitions are removed. Image 308 is an example of image 302 post-high pass filtering through filter 210. Similar to image 306, tone and color transitions are removed leaving only areas having high spatial frequency representative of finer detail.

At operation 106, any differences are determined between the high frequency areas of the source content and the SDR content. That is, comparator 208 of FIG. 2 can compare the filtered source content and filtered SDR content to determine whether any high frequency areas that exist in the filtered source content are missing in the filtered SDR content. If so, this is indicative of where, e.g., tone mapping, details from the source content were lost. In accordance with one embodiment, a variance threshold is utilized to determine the existence of lost detail. For example, in a local neighborhood (e.g., a 7×7 pixel area), variance is calculated for the filtered source content and SDR content. Anywhere that the variance in image 300 of FIG. 3 is greater than the variance in image 302 is an indication that information, i.e., detail, has been lost. As utilized herein, the term variance can refer to an image statistic used to quantify the level of noise or structure in an image. For example, an estimated local variance of an image can be used as a quality measure of the structural similarity between two images. This results in a first pixel map of the one or more identified areas.

Referring back to FIG. 1A, an image processing map 312 of FIG. 3 is created based on the one or more identified areas determined as having lost detail at operation 110. FIG. 1C is a flow chart describing the processes performed to create the image processing map 312. At operation 112, morphological dilation is performed by morphological operation unit 212 of FIG. 2 on the one or more identified areas determined in operation 100, and at operation 114, morphological erosion is performed by morphological operation unit 212 on the one or more identified areas. At operation 116, a second pixel map 310 is defined based on the morphological dilation and erosion of pixels corresponding to the one or more identified areas. That is, the morphology operations are used to "expand" the first pixel map to create a second pixel map 310. It should be noted that morphological dilation followed by erosion can be referred to as morphological closing.

Morphology can refer to image processing operations that process images based on shapes. Morphological operations apply a structuring element to an input image, creating an output image of the same size. In a morphological operation, the value of each pixel in the output image is based on a comparison of the corresponding pixel in the input image with its neighbors. By choosing the size and shape of the neighborhood, a morphological operation that is sensitive to specific shapes in the input image can be constructed.

Dilation adds pixels to the boundaries of objects in an image, while erosion removes pixels on object boundaries. The number of pixels added or removed from the objects in an image depends on the size and shape of the structuring element used to process the image. In the morphological dilation and erosion operations, the state of any given pixel in the output image is determined by applying a rule to the corresponding pixel and its neighbors in the input image.

In the context of the present disclosure, these morphological operations are performed to improve confidence that the identified areas are indeed areas where detail has been lost, as well as to generate results that are more consistent. Prior to performing morphological dilation and erosion in operations 112 and 114, pixels associated with the one or more identified areas may be scattered throughout the initial map. Performing morphological dilation can take a small area of pixels and make it bigger, thereby making pixel groups contiguous to each other, resulting in the aforementioned increase in consistency. Performing morphological erosion subsequent to the morphological dilation then retains the bigger areas of pixels and discards areas that may have been generated in error/by accident resulting in the aforementioned increase in confidence.

A border is defined about the one or more identified areas by taking the difference between the first pixel map and the second pixel map 310. This results in an image processing map 312 of FIG. 3 made up of pixels surrounding the identified one or more areas where detail has been lost.

Again referring back to FIG. 1A, at operation 120, pixels of the image processing map 312 of FIG. 3 are used for local color matching to the source content 202 of FIG. 2 by color transformation unit 214. This localized color matching at the borders surrounding pixels of interest is useful because, generally, colors match in border areas where no detail has been lost. On the other hand, colors do not generally match in border areas where detail has been lost. Thus, color matching at the borders (which in essence, achieves a localized replication of color grading) ensures color matching at every area where lost detail information will be reintroduced.

Various methods of color matching or balancing can be utilized in accordance with various embodiments of the present disclosure. In accordance with one embodiment, an algorithm for color balancing between the source content 202 and the SDR content 204 can receive as input, a set of color correspondences between source content 202 (target image) and the SDR content 204 (source image). A goal of this color matching or balancing is to transform the color of a raw scan to match the color graded master. A global color space transformation may then be addressed by computing a smooth vector filed in a CIE color space that maps the gamut of the source image to that of the target image. Normalized radial basis functions can be used to compute optimized shape parameters based on the source and target images. Other methods of color balancing may involve transferring color distribution statistics from one image to another image, where mean and standard deviation of the color distribution in a color space is computed. Then, by scaling and translating source image parameters onto the parameters of the target image, color transformation can be achieved. Other color balancing techniques can rely on manual color transfer using fuzzy principal component analysis. Examples of color balancing are described in a paper entitled, "Fast and Stable Color Balancing for Images and Augmented Reality," by Thomas Oskam, et al., which is incorporated herein by reference in its entirety.

At operation 130 of FIG. 1A, pixels of the SDR content 204 of FIG. 2 are substituted with corresponding pixels identified in the image processing map. This can be performed by pixel transfer/merge unit 216, which outputs HDR content 222. That is, the color balancing performed in operation 120 is applied to the pixels of source content 202, which correspond to the mapped pixels of the second map 310. The color matched pixels are then merged with SDR content 204 to produce a final image, i.e., HDR content 218, and example of which is image D 314 of FIG. 3. In merging the color matched pixels, it should be noted that the pixels can be transferred to SDR content 204 directly (i.e., in accordance with a Red Green Blue (RGB) color model). Alternatively, the pixels can be transferred in their component parts (i.e., luminance or brightness component and chromaticity or hue/saturation components). For example, luminance information from the color-matched pixels of the source content 202 can be isolated and transferred to SDR content 204 to replace the existing, corresponding pixels. Saturation information can be isolated and transferred in the same or similar manner. It should also be noted that a user of content editor 206 can be provided with at least some control over which color dimensions are to be preserved or substituted, e.g., brightness, saturation, hue, etc., and to what degree.

Moreover, and although various embodiments described herein have been presented in the context of movies/film, the same or similar processes can be utilized for still images. It should be noted that pixel RGB values can be transformed into color components, e.g., luminance, hue, and saturation. This allows for control over how color information is transferred. For example, if the creative desire is only to make highlights brighter and more detailed without otherwise altering the color grade, only the luminance component is transferred, while the hue and saturation components of the graded image can be preserved.

Figure 4:
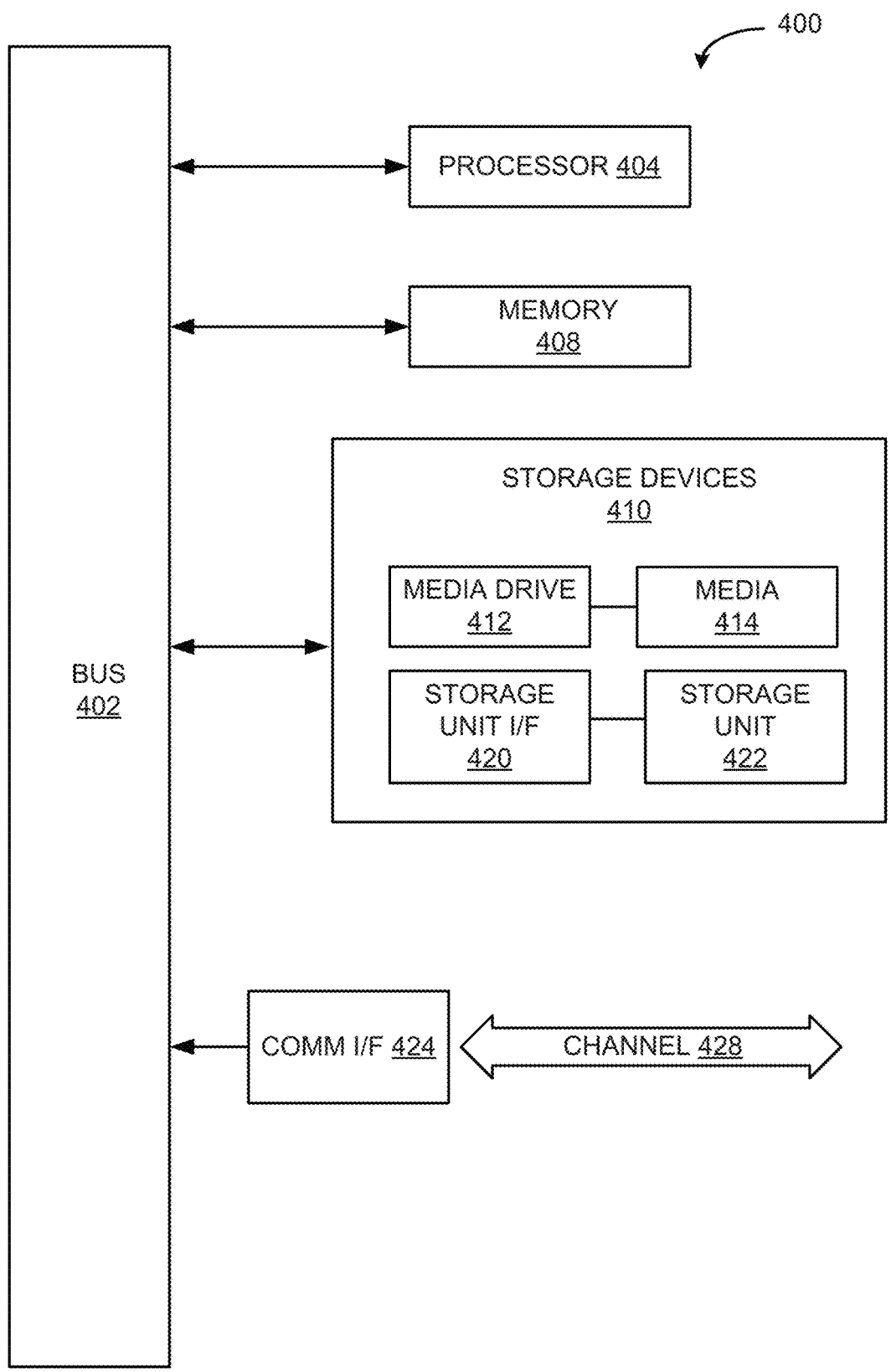
FIG. 4 is an example computing component that may be used to implement various features of embodiments of the present disclosure.

FIG. 4 illustrates an example computing component that may be used to implement various features of the system and methods disclosed herein, such as the aforementioned features and functionality of one or more aspects of content editor 206.

As used herein, the term component or unit might describe a given unit of functionality that can be performed in accordance with one or more embodiments of the present application. As used herein, a component or unit might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components or units described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components or units in various combinations and permutations. Even though various features or elements of functionality may be individually described or claimed as separate components or units, one of ordinary skill in the art will understand that these features and functionality can be shared among one or more common software and hardware elements, and such description shall not require or imply that separate hardware or software components or units are used to implement such features or functionality.

Where components or units of the application are implemented in whole or in part using software, in one embodiment, these software elements can be implemented to operate with a computing or processing component or unit capable of carrying out the functionality described with respect thereto. One such example computing component or unit is shown in FIG. 4. Various embodiments are described in terms of this example-computing component 400. After reading this description, it will become apparent to a person skilled in the relevant art how to implement the application using other computing components or architectures.

Referring now to FIG. 4, computing component 400 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example navigation systems, portable computing devices, and other electronic devices that might include some form of processing capability.

Computing component 400 might include, for example, one or more processors, controllers, control components, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing component 400 or to communicate externally.

Computing component 400 might also include one or more memory components, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 414 might include, for example, a hard disk, an integrated circuit assembly, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot, a PCMCIA slot and card, and other fixed or removable storage units 422 and interfaces 420 that allow software and data to be transferred from the storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method to generate high dynamic range (HDR) content from standard dynamic range (SDR) content, the computer-implemented method comprising:
    isolating respective high spatial frequency areas by filtering each of the SDR content and source content from which the SDR content is derived;
    generating a first pixel map representing differences between the respective high spatial frequency areas of each of the SDR and source content;
    identifying, based on the first pixel map, one or more areas of the SDR content where detail has been lost relative to the source content;
    creating an image processing map based on the one or more areas and by operation of a processor;
    using pixels of the image processing map for local color matching to the source content; and
    generating the HDR content by substituting pixels of the SDR content with corresponding pixels identified in the image processing map.

2. The computer-implemented method of claim 1, wherein the SDR content comprises an original color graded master.

3. The computer-implemented method of claim 1, wherein the detail comprises bright detail information clipped or rolled off from the SDR content.

4. The computer-implemented method of claim 1, wherein the image processing map is created by performing morphological dilation on the one or more areas.

5. The computer-implemented method of claim 4, further comprising performing morphological erosion on the one or more areas.

6. The computer-implemented method of claim 5, further comprising defining a second pixel map based on the morphological dilation and erosion of pixels corresponding to the one or more areas.

7. The computer-implemented method of claim 6, further comprising defining the image processing map based on differences between the first and second pixel maps.

8. The computer-implemented method of claim 7, wherein the differences between the first and second pixel maps define boundaries about the pixels corresponding to the one or more areas.

9. The computer-implemented method of claim 8, wherein the local color matching to the source content comprises performing color balancing based upon a set of color correspondences between the source content and the SDR content at the defined boundaries.

10. The computer-implemented method of claim 1, wherein substituting the pixels comprises transforming pixel RGB values into one or more color components.

11. A system to generate high dynamic range (HDR) content from standard dynamic range (SDR) content, the system comprising:
    a comparator adapted to receive images representative of source content and SDR content derived from the source content, isolate respective high spatial frequency areas of each of the source and SDR content, generate a first pixel map representing differences between the respective high spatial frequency areas of each of the source and SDR content, and identify, based on the first pixel map, one or more areas of the SDR content where detail has been lost;
    a morphological operation unit adapted to apply morphological operations to the SDR and source content creating an image processing map based on the one or more areas and by operation of a processor;
    a color transformation unit adapted to use pixels of the image processing map for local color matching to the source content; and
    a pixel merge unit adapted to generate the HDR content by substituting pixels of the SDR content with corresponding pixels identified in the image processing map.

12. The system of claim 11, wherein the comparator further comprises a high pass filter adapted to filter the source and the SDR content to isolate the respective high spatial frequency areas.

13. The system of claim 12, wherein the comparator is further adapted to compare the respective high spatial frequency areas.

14. The system of claim 13, wherein the respective high spatial frequency areas are compared based upon determining whether a variance in the high spatial frequency areas in the source content is greater than a variance in the areas of high spatial frequency areas in the SDR content.

15. The system of claim 11, wherein the image processing map is representative of boundaries surrounding pixels corresponding to the high spatial frequency areas of the SDR content where the detail is to be restored.

16. The system of claim 11, wherein the morphological operations comprise a dilation operation followed by an erosion operation.

17. A non-transitory computer-readable medium storing a program executable to perform an operation to generate high dynamic range (HDR) content from standard dynamic range (SDR) content, the operation comprising:

isolating respective high spatial frequency areas by filtering each of the SDR content and source content from which the SDR content is derived;

generating a first pixel map representing differences between the respective high spatial frequency areas of each of the SDR and source content;

identifying, based on the first pixel map, one or more areas of the SDR content where detail has been lost relative to the source content;

creating an image processing map based on the one or more areas and by operation of a processor when executing the program;

using pixels of the image processing map for local color matching to the source content; and generating the HDR content by substituting pixels of the SDR content with corresponding pixels identified in the image processing map.

18. The non-transitory computer-readable medium of claim 17, wherein the SDR content comprises an original color graded master.

19. The non-transitory computer-readable medium of claim 17, wherein the detail comprises bright detail information clipped or rolled off from the SDR content.

20. The non-transitory computer-readable medium of claim 17, wherein the image processing map is created by performing morphological dilation on the one or more areas.

* * * * *

UNITED STATES PATENT AND TRADEMARK OFFICE
CERTIFICATE OF CORRECTION

PATENT NO. : 10,699,391 B2  
APPLICATION NO. : 15/461424  
DATED : June 30, 2020  
INVENTOR(S) : Stefan Luka Page 1 of 1

It is certified that error appears in the above-identified patent and that said Letters Patent is hereby corrected as shown below:

In the Claims

In Column 11, Line 7, in Claim 14, delete "the areas of" and insert -- the --, therefor.

Signed and Sealed this  
Twenty-second Day of September, 2020

Andrei Iancu  
*Director of the United States Patent and Trademark Office*